United States Patent [19]

Bratton

[11] Patent Number: 4,793,849
[45] Date of Patent: Dec. 27, 1988

[54] HEAT SHIELD FOR REFRACTORY TUBE IN MOLTEN GLASS FEEDER

[75] Inventor: Kenneth L. Bratton, Windsor, Conn.

[73] Assignee: Emhart Industries, Inc., Farmington, Conn.

[21] Appl. No.: 151,732

[22] Filed: Feb. 3, 1988

[51] Int. Cl.[4] .............................................. C03B 7/08
[52] U.S. Cl. ...................................... 65/328; 65/330; 65/331; 65/332
[58] Field of Search ................ 65/328, 330, 331, 332, 65/180

[56] References Cited
U.S. PATENT DOCUMENTS 4,328,023  5/1982  Vilk ....................................... 65/328
4,581,055  4/1986  Bratton ................................. 65/328

Primary Examiner—Arthur Kellogg
Attorney, Agent, or Firm—Spencer T. Smith

[57] ABSTRACT

A molten glass feeder includes a feeder bowl and a rotating refractory tube. Molten glass is discharged through openings in an orifice plate which are controlled by vertically displaceable needles. To reduce heat loss through the refractory tube, a heat shield is provided which is made up of two mirror imaged parts. Each part has a semicylindrical pan having a lip at the bottom for supporting a semi-circular support plate. Located on this plate is an insulation retainer which has a semi-circular base and a vertical wall at its diameter. This wall forms an insulation receiving bin with the pan.

2 Claims, 2 Drawing Sheets

HEAT SHIELD FOR REFRACTORY TUBE IN MOLTEN GLASS FEEDER

It is important to control the temperature of molten glass in a feeder of the type having reciprocating needles operating inside a refractory tube that rotates inside a feeder bowl. A heat shield may be used at the upper end of the refractory tube to reduce heat losses thereby facilitating closer control of the temperature, and hence, the viscosity of the molten glass in the feeder bowl. A state of the art heat shield is disclosed in U.S. Pat. No. 4,581,055.

It is an object of the present invention to provide an improved heat shield.

Other objects and advantages of the present invention will become apparent from the following portion of the specification and from the following drawings, which illustrate in accordance with the mandate of the patent statutes, a presently preferred embodiment incorporating the principles of the invention.

Referring to the drawings.

Figure 1:
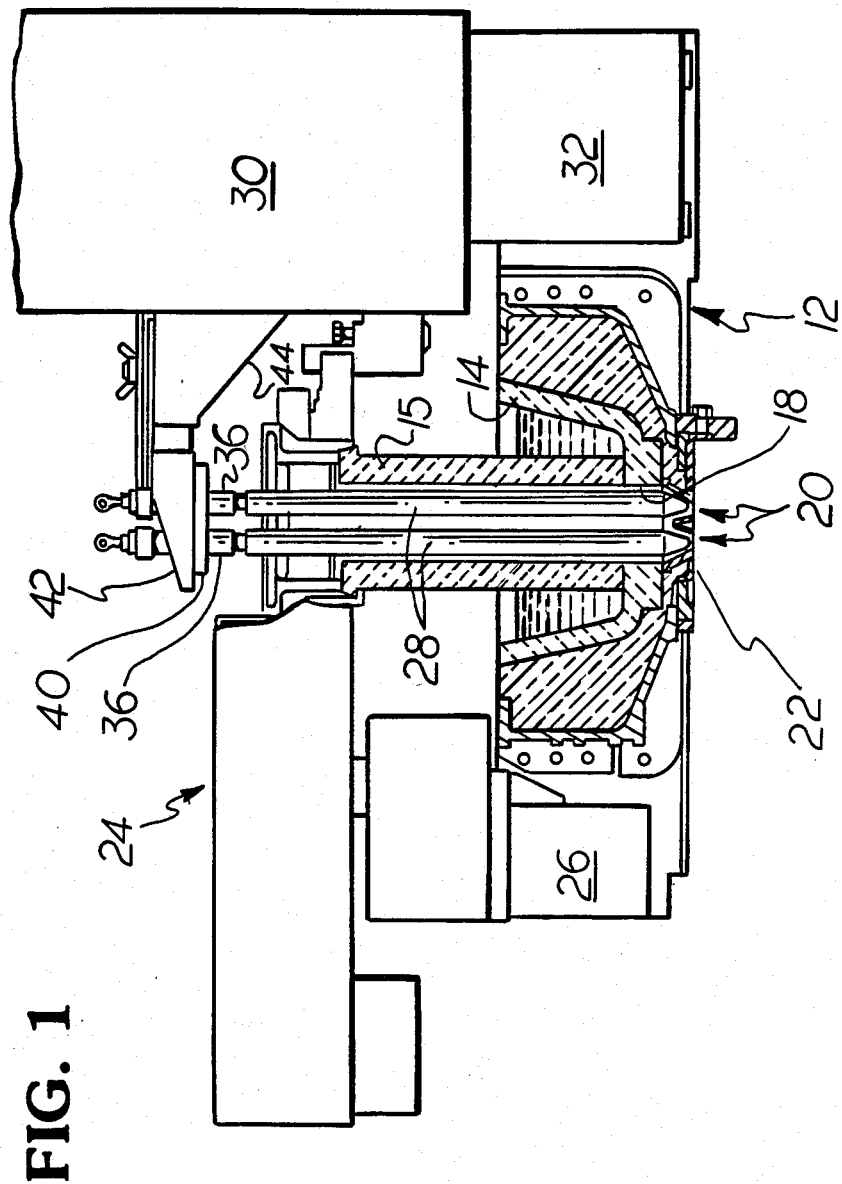
FIG. 1 is an elevational view with portions broken away illustrating the molten glass feeder made in accordance with the teachings of the present invention.
Figure 2:
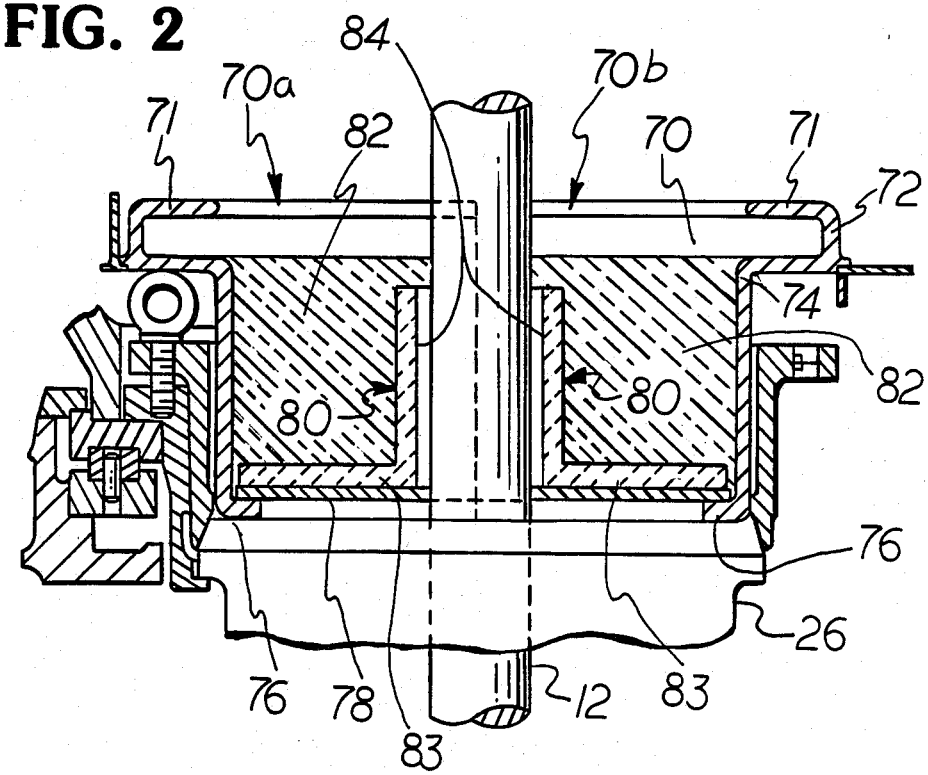
FIG. 2 is an enlarged vertical section of the heat shield of the molten glass feeder taken through one of the needles and in a direction perpendicular to the plane of FIG. 1.

The molten glass feeder has a reservoir for containing molten glass received from a forehearth 12. The outside and bottom portions of the reservoir are defined by a feeder bowl 14 and the inside wall of the reservoir is defined by a refractory tube 16 which normally rotates with the bottom end surface of the tube spaced from the feeder bowl. Molten glass, accordingly, flows from the reservoir through this annular clearance, through an opening 18 in the bottom of the feeder bowl 14, and then through a number of openings 20 in an orifice plate 22. The molten glass is discharged from the orifice plate openings 20 as discrete streams of molten glass. The refractory tube 16 and the feeder bowl 14 are fabricated from refractory material to withstand the temperature of the molten glass. The mechanism 24 for rotatively driving the refractory tube 16 is secured to the forehearth 12 by a suitable bracket 26.

To control these streams, the molten glass feeder includes glass feeder needles 28 which can be reciprocated vertically relative to the orifice plate openings 20 by a needle operating mechanism 30 which is also mounted on the forehearth 12 by means of a bracket 32. The needles 28 are secured in needle chucks 36, and the needle chucks are in turn mounted in a needle carrier disk 40. This carrier disk 40 is attached to a needle holder or banjo frame 42, the banjo frame being in turn secured to a bracket 44 that is connected to the needle operating mechanism 30.

Figure 3:
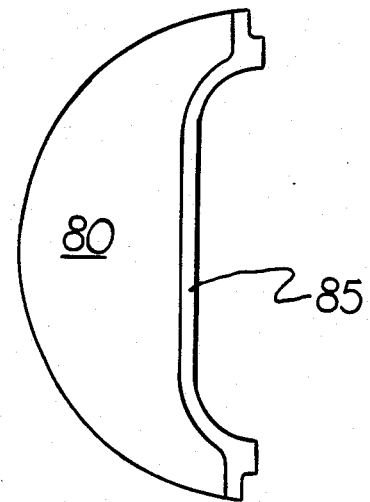
FIG. 3 is a top view of one of the insulation retainers of the heat shield.
Figure 4:
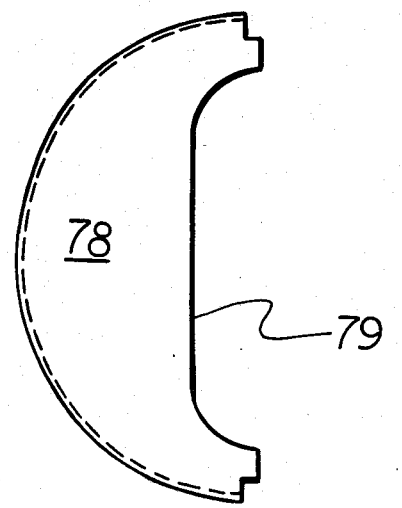
FIG. 4 is a top view of one of the support plates of the heat shield.

The heat shield 70 is made up of two mating semi-circular mirror imaged sections 70a, 70b. The heat shield has a pair of metallic pans 71 each of which has an annular gripping collar 72 and a semi-cylindrical depending portion 74 terminating in a semi-circular lip 76. Supported on the semi-circularly extending lip 76 of each pan half is a semi-circular metal supporting plate 78 (FIG. 4) which has a cut-out 79 to accommodate the needles. Placed on each supporting plate 78 is an insulation retainer 80 (FIG. 3) which is made from refractory material and which defines with the support plate and the pan 71 an insulation 82 receiving bin. The insulation may be loose or otherwise. The insulation retainer 80 has a semi-circular horizontal base portion 83 and an upstanding central wall 84 which is contoured 85 to accommodate the needles (the illustrated machine is a triple gob unit). The vertical wall of the insulation retainer which extends at least to the top of the insulation functions to separate the needles and the insulation, and the support plates prevent fractured pieces of the insulation retainer from dropping down to the orifice plate which lies below. Each half of the heat shield can be readily removed for repair or servicing.

I claim:

1. A molten glass feeder comprising:
   a feeder bowl having a hole at the bottom thereof,
   a refractory tube defining with said feeder bowl a reservoir for molten glass, said refractory tube being selectively sized to surround said opening and being selectively spaced from said feeder bowl to permit molten glass to flow from said reservoir to said hole,
   an orifice plate closing said feeder bowl hole, said plate having a plurality of openings so that molten glass will be discharged therefrom in discrete streams,
   a corresponding plurality of needles cooperating with said openings to control the streams of molten glass, the lower portion of said needles being surrounded by said refractory tube,
   heat shield means surrounding the upper portion of said needles including a pair of opposed metallic semi-cylindrical portions each having
      an inwardly extending lip extending substantially around the bottom of said semi-cylindrical portion,
      a semi-circular metallic plate supported by said lip,
      a refractory element having a semi-circular horizontal base and an upwardly projecting wall at the diameter of said semi-circular base,
      said upwardly projecting wall being contoured to receive said needles, and
      said refractory element defining with said semi-cylindrical portion, a semi-cylindrical volume and
   insulating means contained within said volume.

2. A molten glass feeder according to claim 1, wherein said insulation is loose insulation and the level of said insulation is below the top of said upwardly projecting vertical wall.

* * * * *